US007936793B2

(12) United States Patent
Quiroga et al.

(10) Patent No.: US 7,936,793 B2
(45) Date of Patent: May 3, 2011

(54) METHODS AND APPARATUS FOR SYNCHRONIZING DATA TRANSFERRED ACROSS A MULTI-PIN ASYNCHRONOUS SERIAL INTERFACE

(75) Inventors: Emilio J. Quiroga, Lake Worth, FL (US); Mahibur Rahman, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1186 days.

(21) Appl. No.: 11/097,579

(22) Filed: Apr. 1, 2005

(65) Prior Publication Data

US 2006/0222017 A1 Oct. 5, 2006

(51) Int. Cl.
*H04J 3/06* (2006.01)
*H04L 7/08* (2006.01)

(52) U.S. Cl. ........ 370/506; 370/503; 375/368; 375/371; 710/71

(58) Field of Classification Search .......... 370/503, 370/506, 520; 375/363, 365, 368, 371; 710/71
See application file for complete search history.

(56) References Cited

U.S. PATENT DOCUMENTS

| | | | |
|---|---|---|---|
| 3,792,476 A | 2/1974 | Domer | |
| 3,887,769 A * | 6/1975 | Cichetti et al. | 375/371 |
| 4,071,887 A * | 1/1978 | Daly et al. | 710/305 |
| 4,300,232 A * | 11/1981 | Kato | 370/509 |
| 4,847,867 A * | 7/1989 | Nasu et al. | 375/257 |
| 5,081,654 A | 1/1992 | Stephenson, Jr. et al. | |
| 5,258,980 A * | 11/1993 | Maebara et al. | 370/347 |
| 5,282,196 A * | 1/1994 | Clebowicz | 370/466 |
| 5,349,611 A | 9/1994 | Varian | |
| 5,485,476 A | 1/1996 | Paranjape et al. | |
| 5,802,120 A * | 9/1998 | Muraoka | 375/362 |
| 5,887,039 A * | 3/1999 | Suemura et al. | 375/365 |
| 5,920,600 A | 7/1999 | Yamaoka et al. | |
| 6,031,847 A * | 2/2000 | Collins et al. | 370/508 |
| 6,049,552 A * | 4/2000 | Song | 370/503 |
| 6,079,035 A * | 6/2000 | Suzuki et al. | 714/700 |
| 6,208,839 B1 | 3/2001 | Davani | |
| 6,266,349 B1 * | 7/2001 | Fukui et al. | 370/515 |
| 6,282,683 B1 * | 8/2001 | Dapper et al. | 714/746 |
| 6,546,065 B1 * | 4/2003 | Shimosakoda | 375/364 |
| 6,594,275 B1 * | 7/2003 | Schneider | 370/465 |
| 6,665,308 B1 * | 12/2003 | Rakib et al. | 370/441 |
| 6,771,670 B1 * | 8/2004 | Pfahler et al. | 370/503 |

(Continued)

OTHER PUBLICATIONS

International Search Report.

(Continued)

*Primary Examiner* — Aung S Moe
*Assistant Examiner* — Curtis A Alia
(74) *Attorney, Agent, or Firm* — Ingrassia Fisher & Lorenz, P.A.

(57) ABSTRACT

Methods, devices and systems are provided for word synchronizing multiple serial data bitstreams (106) with a serial framing signal (106A). Offset values (420) are determined (512) from the relative locations of predetermined data correlation values (107) stored within the data buffers during a correlation mode to indicate the amount of skew observed between the framing channel and each of serial data channels. Data received during subsequent operation of each data stream is stored a buffer (402), and the framing signal (106A) is monitored to identify a boundary between data words. When a frame boundary occurs, parallel data is extracted from the buffer using the previously-stored offset values to compensate for bit skew between the data and framing channels.

19 Claims, 7 Drawing Sheets

U.S. PATENT DOCUMENTS

| | | |
|---|---|---|
| 6,795,514 B2 | 9/2004 | Gresham |
| 6,819,728 B2 | 11/2004 | Boerstler |
| 6,915,462 B1 | 7/2005 | Davis et al. |
| 6,917,366 B1 * | 7/2005 | West et al. ............... 345/558 |
| 6,937,683 B1 | 8/2005 | Ratzel |
| 6,970,521 B2 | 11/2005 | Dosho |
| 7,039,436 B1 * | 5/2006 | Kakehi ..................... 455/525 |
| 7,061,939 B1 * | 6/2006 | Chengson et al. ......... 370/503 |
| 7,436,919 B2 | 10/2008 | Rahman et al. |
| 2001/0033568 A1 * | 10/2001 | Spooner ................... 370/366 |
| 2003/0043926 A1 | 3/2003 | Terashima et al. |
| 2003/0091136 A1 | 5/2003 | Sugita |
| 2004/0105515 A1 | 6/2004 | Mo et al. |
| 2004/0141577 A1 | 7/2004 | Brunn et al. |
| 2004/0148537 A1 | 7/2004 | Fuehrer et al. |
| 2004/0148539 A1 | 7/2004 | Leydier et al. |
| 2004/0225761 A1 | 11/2004 | Mitter |
| 2004/0264613 A1 | 12/2004 | Buchmann et al. |
| 2004/0264614 A1 | 12/2004 | Tinker |
| 2006/0159055 A1 | 7/2006 | Turunen |

OTHER PUBLICATIONS

"Digital Visual Interface DVI" Digital Display Working Group, Revision 1.0 Apr. 2, 1999.

* cited by examiner

METHODS AND APPARATUS FOR SYNCHRONIZING DATA TRANSFERRED ACROSS A MULTI-PIN ASYNCHRONOUS SERIAL INTERFACE

TECHNICAL FIELD

The present invention generally relates to data synchronization, and more particularly relates to methods and apparatus for synchronizing serial bitstreams received across a multi-pin asynchronous interface.

BACKGROUND

Electrical and electronic communications continue to permeate every aspect of modem life. Computer systems, for example, are becoming increasingly mobile and inter-networked, portable telephones are becoming more ubiquitous, and consumers continue to demand constant access to streaming video, audio, data and other services. As the demand for such services continues to escalate, a need arises for data communications schemes that are space efficient, yet provide rapid data throughput.

Most conventional data signaling schemes used for digital data can be generally classified as "serial" (i.e. providing a stream of sequential data bits across a single channel) or "parallel" (i.e. providing separate streams of data bits across two or more data channels). Serial schemes have the general advantage of being less complicated and more space efficient than parallel schemes due to the single data channel. In particular, the single serial data channel typically uses a minimal number of "pins" on a microchip or similar module. Multiple data paths present in a parallel data channel can consume additional pins and other chip resources, but are generally capable of providing more data at a given transfer rate than a corresponding serial channel. Stated another way, although the serial channels are generally efficient in terms of space and physical overhead, the data rate for a serial channel must typically be faster than that applied to each of the multiple parallel channels for the serial scheme to transfer an equivalent amount of data. While serial transfer schemes are therefore beneficial for many applications (e.g. when space is limited or pin count is a consideration), the bit transfer rates used to obtain acceptable throughput over a serial channel can be significant.

Further, practical serial transfer rates can be hampered by limited availability of high-speed clock sources, speed limitations of transmitting and receiving devices, and/or other factors. As a result, many data signaling schemes now subdivide data messages into distinct "words" that can be simultaneously transmitted across multiple serial data channels. Such a hybrid scheme offers the advantage of reduced pin count compared to traditional parallel schemes along with lower bit rates typically associated with traditional serial schemes without sacrificing total throughput. Difficulties can arise, however, in reconstructing the original message from the collection of independently-recovered serial data words. These difficulties can result from varying path delays (skew) exhibited by the multiple serial channels, which in turn can result from variations in supply voltage, variations in temperature and other environmental effects, and other factors.

Accordingly, it is desirable to formulate a technique for re-synchronizing the multiple serial bitstreams transferred in a multi-pin asynchronous data interface. In addition, it is desirable to create devices and systems for re-synchronizing the serial bitstreams. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various embodiments, the various serial bit streams received in a multi-pin asynchronous serial interface are bit, word and frame synchronized to each other to create one or more parallel data outputs. The multi-pin asynchronous serial interface typically includes at least one framing channel and any number of serial data channels, with the framing channel providing an indication of boundaries between data words or other appropriate frames. Each of the serial bitstreams received are bit synchronized to each other within independent bit synchronization modules to generate recovered serial data. A word synchronization module further processes the synchronized serial data streams to generate word-aligned parallel output data. The word synchronization module appropriately resolves skew between serial data streams by tracking offsets between each data channel and the framing channel. By determining the relative timing differences between channels, the system can compensate for skew during subsequent operation. The concepts set forth herein may be useful in any communications interface applications (e.g. any interface between any radio frequency (RF) transceivers, baseband modems, and/or the like) and may be readily implemented with complementary metal oxide semiconductor (CMOS) or other integrated circuitry techniques, although other embodiments may be implemented with other forms of integrated circuitry, discrete logic, software and/or any combination of hardware and software components.

Figure 1:
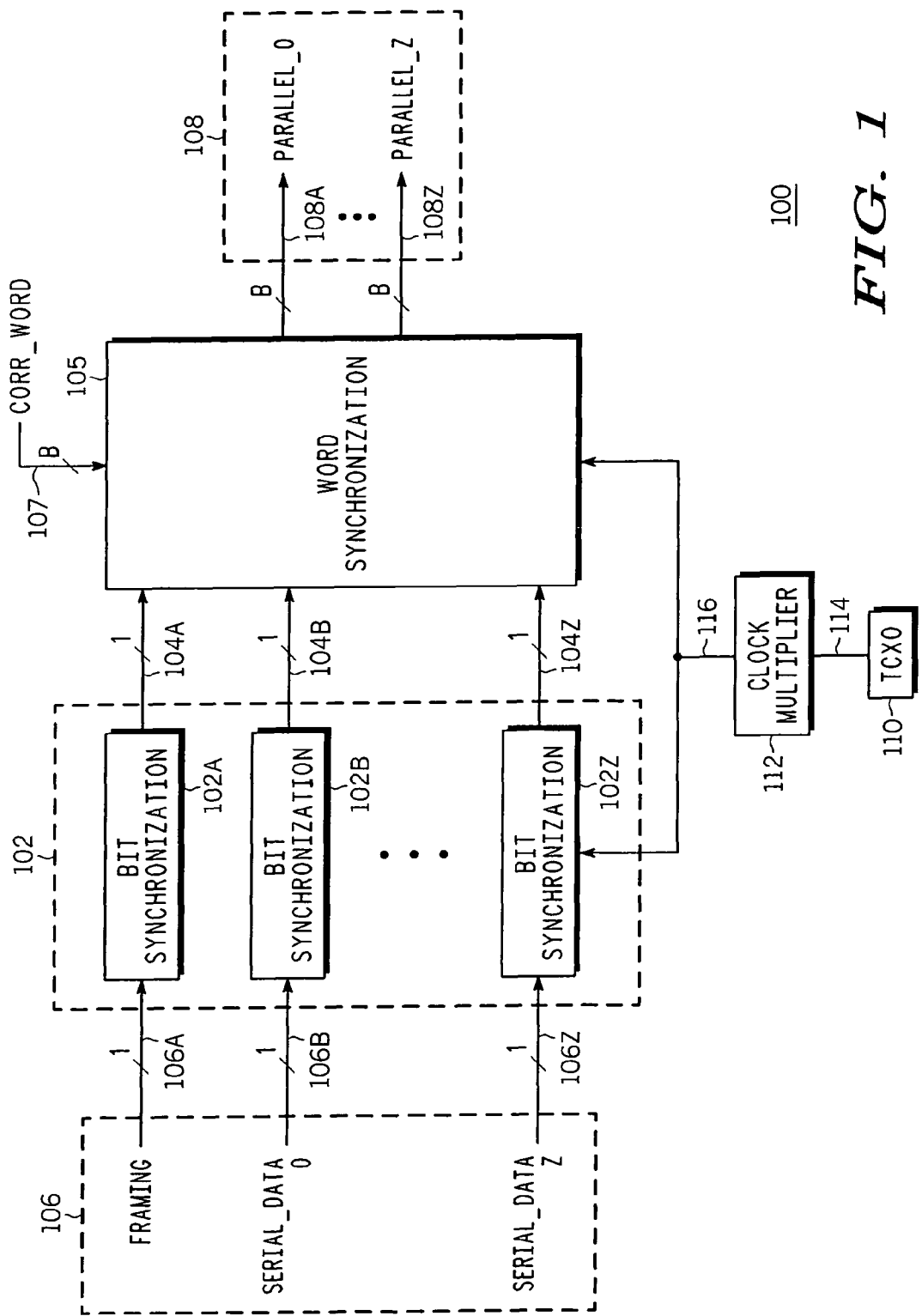
FIG. 1 is a block diagram of an exemplary system for synchronizing multiple serial bitstreams.

Turning now to the drawing figures and with initial reference to FIG. 1, an exemplary embodiment of a system 100 for synchronizing any number of serial bitstreams 106A-Z received at a multi-pin asynchronous interface 106 suitably includes a bit synchronization module 102A-Z for each serial bitstream 106A-Z, as well as a word synchronization module 105. Each bit synchronization module 102A-Z receives one of the serial bitstreams 106A-Z received at interface 106 and recovers a serial data stream 104A-Z at a fixed data rate. Word synchronization module 105 receives each of the synchronized bit streams 104A-Z and produces one or more output streams 108 as appropriate. Output streams 108 may variously include any number of parallel data streams 108A-Z and/or the like.

In various embodiments, each bit synchronization module 102A-Z and word synchronization module 106 receive a clock signal 116 with a frequency that substantially corresponds to an integer multiple (N) of the data rate for the incoming serial data streams 106A-Z. "Substantially" in this context is intended to acknowledge that some variation may exist due to manufacturing, design and implementation imperfections, as well as environmental variation and other factors. As a result, the frequency of signal 116 need not exactly match an integer multiple of the data rate to substantially incorporate the concepts conveyed herein. Clock signal 116 may be produced from any clock generation circuitry or logic in any convenient manner, such as using any crystal, oscillator, phase locked loop (PLL) or other clock source 110, and/or by multiplying or otherwise processing any signal 114 received from a clock source 110 using appropriate logic 116.

Bit synchronization modules 102A-Z are implemented with any integrated, discrete, software, firmware and/or other logic capable of producing a serial data stream 104 at a desired data rate. According to various exemplary embodiments, each bit synchronization module 102A-Z oversamples the associated incoming bit stream 106A-Z using clock signal 116. Because clock signal 116 suitably corresponds to an integer multiple (N) of the bit rate for the incoming stream 106A-Z, the oversampling using clock signal 116 effectively separates each incoming bit period into N distinct phases in which activity can be detected. By identifying bit transitions (e.g. low-to-high or high-to-low state changes) occurring within each phase, one of the phases can be selected based upon the level of activity occurring within that phase. That is, a phase that is likely to have an accurate data value (as compared to the other phases) can be readily identified by monitoring activity occurring within each phase. Although the particular selection algorithms may vary from embodiment to embodiment, the sampling phase can be selected based upon lack of bit transitions occurring within an appropriate number of prior bit periods. Alternatively, the sampling phase may be selected based upon the minimal activity occurring during a particular phase, or any other appropriate technique. Data can then be extracted from the selected phase to produce an accurate representation of the input data stream. The selected phase can be extracted, for example, from the appropriate tap of an N-tap delay line or similar structure. Moreover, an additional delay can be applied in response to the selected phase to ensure that the output serial data stream 104A-Z is provided to word synchronization module 105 at a constant data rate. By continuously oversampling and analyzing each phase of the incoming data stream 106A-Z, serial data can be identified and extracted in an efficient and consistent manner to ensure correct phasing and a relatively constant output data rate.

Word synchronization module 105 is any logic, circuit or other module capable of receiving the bit-synchronized data streams 104A-Z and producing output streams 108A-Z in response thereto. In various embodiments, word synchronization module 105 recovers parallel words 108A-Z from the bit-synchronized serial streams 104A-Z by correlating each of the received serial streams 104A-Z to a known synchronization word 107, which may be pre-programmed into word synchronization module 105 and/or received during an initial training period as appropriate. During subsequent operation, the known correlation between the synchronization word 107 and each stream 104A-Z can be used to identify data word boundaries. Various embodiments further identify framing information about words transferred across interface 106 by dedicating one or more serial channels (e.g. channel 106A in FIG. 1) to transmitting framing information. Such information may include, for example, an identification of the most or least significant bit of data words transmitted upon the other serial lines 106B-Z. Framing boundaries may be indicated in any manner. In various embodiments, framing channel 106A receives transfer word(s) of predefined bit patterns while interface 106 is active. This bit pattern may be chosen somewhat arbitrarily, provided that the pattern does not repeat except at word boundaries to prevent ambiguity. In an eight-bit word, for example, "1000000" or "00100000" would be acceptable framing patterns, whereas "10001000" or "10101010" would create difficulty in identifying word boundaries. While many embodiments will continually repeat a single-word bit pattern on framing channel 106A, other embodiments may incorporate variable patterns, multiple patterns, patterns that are configurable during device operation, and/or any other features.

In operation, each serial bitstream 106A-Z is received at a bit synchronization module 102A-Z that oversamples the received data, selects an appropriate phase for extracting data, and provides an extracted serial bit stream to word synchronization module 105 at a common data rate. Word synchronization module 105 then assembles parallel data words 108A-Z from the bit-synchronized data streams 104A-Z as appropriate. In various embodiments, word synchronization module 105 determines offsets between each data channel 106B-Z and framing channel 106A during an initial correlation training mode. These offsets can be used during subsequent operation to identify word boundaries in the bit-synchronized serial data.

Figure 2:
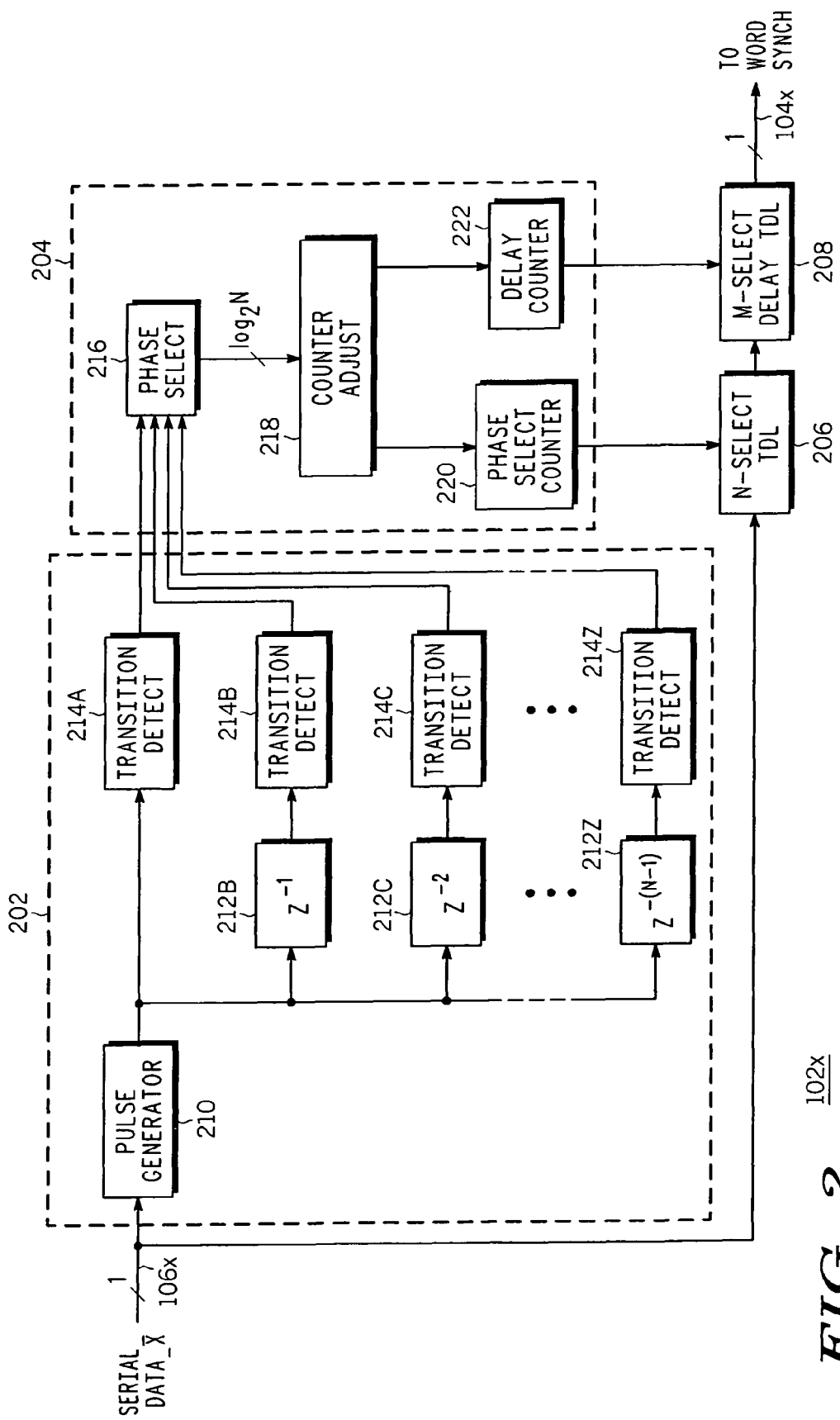
FIG. 2 is a block logic diagram of an exemplary bit synchronization module.

Data and framing signals received via interface 106 are appropriately bit synchronized in any appropriate manner. Turning now to FIG. 2, an exemplary bit synchronization module 102x (representing any of the bit synchronization modules 102AZ in FIG. 1) suitably includes an activity detection module 202, a phase selection module 204 and a data extraction module 206. Bit synchronization module 102x may also include delay module 208 as appropriate. Each module 202, 204, 206 is implemented with any integrated, discrete, software and/or firmware constructs capable of performing the features described herein. Although not expressly shown in FIG. 2, some or all of the-processing modules 202, 204, 206, 208 receive common clock signal 116 (FIG. 1) to provide oversampling and synchronization of input streams 106A-Z.

Activity detection module 202 is any logic capable of detecting bit transitions in received serial data 106. Bit transitions may include low-to-high and/or high-to-low transitions, for example, and may be detected in any manner. As shown in FIG. 2, an exemplary embodiment of activity detection module 202 suitably includes a pulse generator 210 and any number of parallel channels each corresponding to one of the "N" phases of the oversampled bit period. Each channel suitably includes a transition detector 214A-Z and an appropriate delay 212B-Z to identify pulses occurring within each phase of the bit period. Pulse generator 210 produces a pulse or other suitable signal in response to a bit transition observed in signal data 106x. The signal produced by pulse generator 210 is then observed by one of the detector modules 214A-Z corresponding to the phase in which the signal was produced. In further embodiments, detector modules 214A-Z detect if any transitions occurred (e.g. if any pulses/signals are received from generator 210) during an appropriate number (P) of prior bit periods, where P is any positive integer. In such embodiments, each detector module 214A-Z effectively determines whether any activity occurred during a phase of interest during the previous P bit periods. Detector modules 214A-Z provide appropriate digital signals or other indicators to phase selection module 204 in response to activity detected within each phase.

Phase selection module 204 is any circuit, logic or other module capable of identifying one of the N oversampled phases of input data 106x that is suitable for extracting of synchronized serial data. In various embodiments, phase selection module 204 includes logic 216 that selects the appropriate phase based upon activity occurring within that phase. This selection may be made according to any algorithm or criteria. For example, the phase having the fewest number of bit transitions over an appropriate number of prior bit periods may be selected. Alternatively, the selected phase could be chosen to be a phase that precedes or follows another phase in which one or more bit transitions have occurred. Any techniques that identify one or more phases suitable for capturing data could be used in a wide array of alternate embodiments.

Various embodiments of selection module 204 further identify the selected phase by adjusting one or more counters 220, 222 that control switching and/or data extraction taps within extraction and/or delay modules 206, 208. Counter adjust logic 218, for example, receives an indication of the selected phase from phase selection logic 216 as appropriate. In various embodiments, the indication is provided over one or more signal lines interconnecting logic 216 and logic 218. In such embodiments, the number of parallel signal lines used to represent the selected state may equal or exceed the base-2 logarithm of the clock multiplier (i.e. $\log_2 N$) as appropriate. Alternatively, the selected phase may be represented as a digital value stored in a memory, register or similar construct, and/or represented in any other manner. Counter logic 218 adjusts counters 220, 222 as appropriate to extract the selected state from input stream 106x. Logic 218 may increment and/or decrement counters 220, 222, for example, to identify appropriate taps on extraction module 206 and/or delay module 208 to extract data from the selected phase and/or to compensate for timing, respectively. Additional detail regarding counter adjust logic 218 and counters 220 and 222 is provided below.

Extraction module 206 is any circuit, logic or other module capable of capturing a data value from the selected phase of input stream 106x. In various embodiments, extraction module 206 is a tapped delay line or similar structure that includes a suitable number of data "taps" for extracting data. In various embodiments, extraction module 206 includes at least N data taps, with each tap separated from a subsequent tap by a buffer or similar delay element to provide appropriate time domain separation between phases. Input stream 106x is provided to extraction module 206, which captures the selected phase using control signals received from phase selection module 204.

In various embodiments, a subsequent delay module 208 receives the extracted data signal and provides an appropriate time domain delay to compensate for the phase selection in extraction module 204. That is, as the phase selection delay is reduced in extraction module 206, an additional delay is provided by delay module 208 to ensure that the timing and phasing of output signal 104 remain relatively constant. Delay module 208 may be implemented with a tapped delay line similar to that used in extraction module 206. In various embodiments, delay module 208 includes more data taps than extraction module 206, however, to provide precise compensation for phase adjustment timing.

The resulting serial bit stream 104x output from bit synchronization module 102 may therefore be appropriately clocked to the reference clock signal 116, extracted from a reliable phase of input stream 106x, and adjusted for consistent phase synchrony. The synchronized bit stream 104x may be provided to word synchronization module 105 (FIG. 1) or otherwise processed as appropriate.

Figure 3:
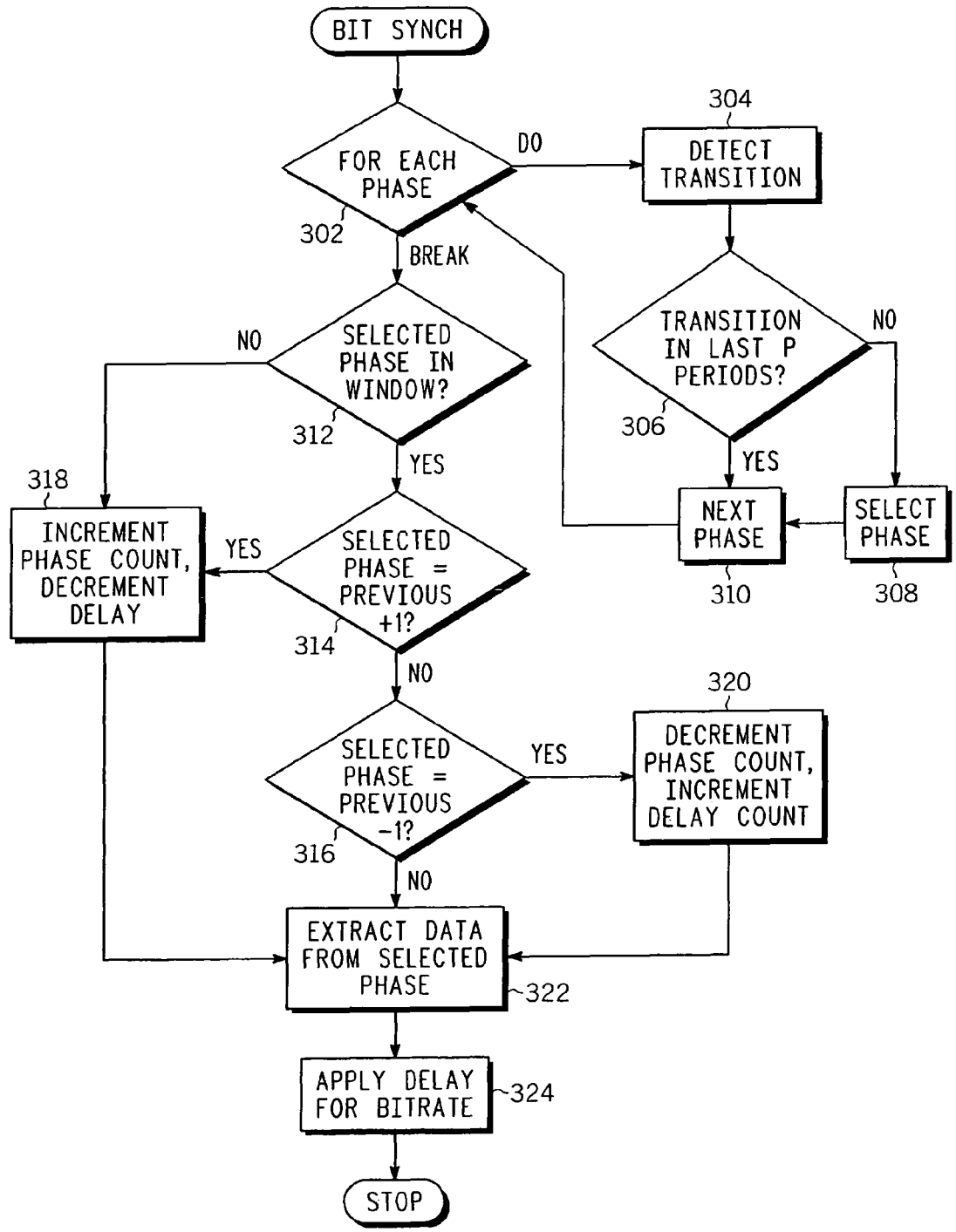
FIG. 3 is a flowchart of an exemplary process for bit synchronizing serial bitstreams.

With reference now to FIG. 3, an exemplary process 300 for bit synchronizing a serial bitstream to other bitstreams received on a common asynchronous interface suitably includes the broad steps of detecting activity occurring within each phase of the serial bitstream (step 304), selecting one of the phases (step 308) based upon the activity detected, and extracting data from the selected phase (step 322). Although FIG. 3 shows an exemplary process 300 for phase selection and extraction using phase and delay counters (elements 220, 222 in FIG. 2), equivalent embodiments may incorporate widely varying structures and processes. The flowchart in FIG. 3 is therefore intended as a logical representation of one exemplary process for extracting data from a selected phase of an input bitstream that may be supplemented or otherwise modified in any manner.

As described above, process 300 suitably begins by evaluating each phase of the input bitstream 106 to identify bit transitions or other activity occurring within that phase (step 302). Each of the phases suitably corresponds to a cycle of common clock signal 116 (FIG. 1), thereby creating an appropriate number of phases depending upon the ratio of the frequency of signal 116 to the bit rate of input bit stream 106.

Activity occurring within each phase may be detected in any manner (step 304), such as the pulse generation and detection scheme described in FIG. 2. The selected phase is then determined according to any suitable technique. In the exemplary embodiment shown in FIG. 3, transitions occurring within each phase are monitored over an appropriate number (P) of prior bit periods (step 306), with the active phase being selected if no bit transitions are identified during that time (step 308). If one or more transitions are identified during the prior bit periods, the subsequent phase is evaluated (step 310). In equivalent embodiments, however, the selected phase may be determined by identifying a phase with one or more transitions and then selecting the phase preceding or succeeding the transitional phase. The selected phase could alternately be determined as the phase having a minimal number of bit transitions occurring within the prior bit periods, and/or according to any other technique based upon the level activity occurring within the various phases of input bit stream 106.

FIG. 3 shows that the selected phase may be further processed to select appropriate data taps on extraction and delay modules 206, 208. In the embodiment shown in FIG. 3, the selected phase is initialized to any appropriate value (e.g. a middle phase), with subsequent iterations of steps 302-310 used to update the previously selected phase. In steps 312-320, counters 220, 222 (FIG. 2) are incremented and/or decremented as appropriate to obtain data from the selected phase at extraction module 206 and to provide a corresponding delay at module 208. Accordingly, increases in phase count typically correspond to decreases in delay count, and vice versa. The exemplary process 300 shown in FIG. 3 increments the phase count (step 318) if the selected phase is outside of a one-phase "window" of the previously selected phase (step 312) or if the selected phase is one phase in advance of the previously selected phase (step 314). Alternate embodiments may instead decrement the phase count when the selected phase is outside the "window", or may eliminate the window concept entirely. Process 300 similarly decrements the phase counter (step 320) when the selected phase prior to the previously selected phase (step 316). The values placed within counters 220, 222 may then be used to extract data from the selected data taps of extraction module 206 (step 322) and/or delay module 208 (step 324) as appropriate. Again, any phase selection/determination scheme may be used in a wide array of alternate embodiments.

The above-described embodiment emphasizes a bit synchronization technique suitable for use with multi-pin asynchronous interfaces that provides phase synchrony between serial bit streams while accurately extracting data from each phase. Various implementations of the concepts described above may be readily implemented using conventional digital circuitry, thereby reducing or eliminating the need for analog charge pump or voltage controlled oscillator (VCO) circuitry, which can be cumbersome to implement. Further, phase synchronized serial bitstreams can greatly simplify the circuitry used in various embodiments of word synchronization module 105. Nevertheless, alternate embodiments of bit synchronization modules 102A-Z may incorporate analog or digital phase lock loops (PLLs) and/or any other phase selection techniques as appropriate.

Figure 4:
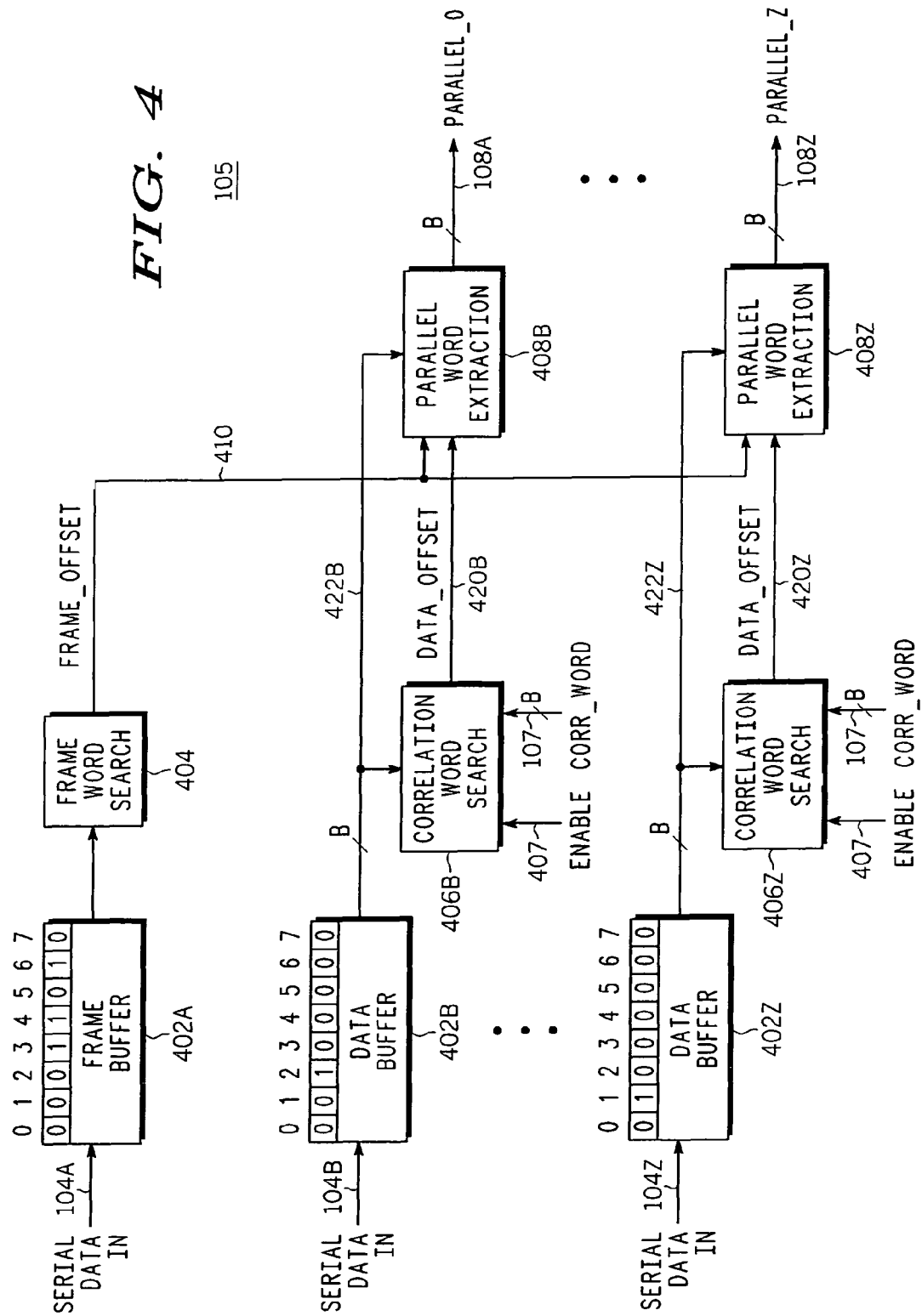
FIG. 4 is a block diagram of an exemplary word synchronization module.

The bit-synchronized data and framing information is then applied to a word synchronization module 105 to correlate each bitstream to an appropriate word or frame boundary, and/or to extract parallel outputs 108A-Z from the serial data. With reference now to FIG. 4, an exemplary word synchronization module suitably includes a buffer 402 and a word search module 404 for each of the serial input streams 104A-Z, as well as a parallel word extraction module 408 for each of the data streams 104B-Z. Bits arriving on each serial line 104A-Z are sequentially shifted in or otherwise stored within a buffer 402 corresponding to that serial line 104A-Z. A word search module 406A-Z identifies pre-determined bit patterns stored within the associated buffer 402A-Z and produces an offset value 410, 420B-Z to indicate the location of the pre-determined pattern in the buffer. By tracking the location of predetermined patterns in buffers 408, the skew of each data channel with respect to a reference channel can be determined. The offset values identified during a correlation/initialization period may then be used to compensate for bit skew during subsequent operation. Each of the modules-402, 404, 406 and 408 shown in FIG. 4 may be clocked using signal 116 (FIG. 1) or another clock signal as appropriate.

Data buffers 402A-Z are any memories, registers or other structures capable of maintaining some portion of one or more serial bitstreams 104A-Z for at least a short period of time. In various embodiments, buffers 402A-Z are operated and maintained as shift registers, with buffer 402A-Z holding a finite record of the last bit values received and with each serial bit arriving on channel 104A-Z ultimately replacing a bit received at an earlier bit cycle. In an eight bit shift register implementation, for example, newly-arriving bits occupy Bit 0 (shown at the left edge of buffers 402A-Z in FIG. 4) and are shifted toward Bit 7 (shown at the right edge of buffers 402A-Z in FIG. 4). In this example, then, buffer 402 would store each bit value received on a serial channel 104 during the previous eight bit cycles, with bits being removed from buffer 402 during the ninth bit cycle. As described more fully below, bit correlations between serial channels 104A-Z may be determined by evaluating the relative positions of known bitstreams stored within buffers 402A-Z, and these correlations can be used to track word boundaries in each serial bitstream. Buffers 402 are provided for each data channel 104B-Z, as well as framing channel 104A.

The size of each buffer 402 varies from embodiment to embodiment, but most embodiments will maintain enough data within buffer 402 to ensure the presence of a complete data word even when the serial channel is experiencing maximum positive or negative skew. In an embodiment transmitting serial data at a 46 MHz bit transfer rate and having a maximum expected inter-pin skew of +/−35 nsec, for example, buffer 402 may be constructed to maintain at least two bits (corresponding to 46 MHz * 35 nsec, rounded up) on either side of a received data word. If words are defined to be four bits in length in this example, then, buffer 402 would be large enough maintain the four data bits, plus two data bits on either side of a centrally-located (e.g. "zero" skew) word for a total of at least eight bits to ensure that an entire data word was maintained within the buffer. The particular parameters used in this example are exemplary, and actual embodiments may vary significantly from the parameters set forth herein. Other embodiments may be based upon eight or sixteen bit words, for example, or data words of any other size. Similarly, data transmit rates and values for maximum skew will vary widely depending upon environmental conditions and other factors.

Frame word search module 404 and data correlation word search modules 406B-Z are any circuits, software or other logic capable of identifying the location of a pre-determined bit sequence within one or more buffers 402A-Z. In an exemplary embodiment, word search modules 404 and 406B-Z are implemented with conventional hardware and/or software comparator logic.

The pre-determined sequence(s) present within serial bitstreams 104A-Z may be determined in any manner. In some embodiments, the predetermined bit sequence simply changes state to indicate the location of a most (or least) significant bit in a data word. Alternatively, bits may be placed in a known (e.g. high or low) state for the duration of a data word, and then placed in the opposite state when transmission of the data word is complete. In still other embodiments, bit sequences of high and low bits may be formulated in any manner capable of indicating word or frame boundaries. The term "predetermined", then, simply means in this context that the bit sequence or scheme is capable of conveying meaningful information that can be interpreted by one or more word search modules 404, 406 or other components of system 100 as appropriate.

Each word search module 404, 406B-Z is capable of identifying an "offset" indicating the difference between an actual position of the predetermined bit sequence and a reference location within buffer 402A-Z. The reference location may be defined in any manner, and may correspond to the beginning, end, center or any other location within data buffer 402A-Z. The central locations of buffer 402A-Z, for example, may be designated as a point of "zero skew", with subsequent bit offsets determined with respect to this somewhat arbitrarily-chosen point of reference. The computed offsets indicate the amount of bit skew present on each serial channel 104, and can be used to correct for skew during subsequent operation. For consistency, the examples below assume that the central bits (bits 2:5) of buffers 402A-Z are the reference "zero skew" point, but other embodiments may use any other position within buffers 402A-Z as a reference for offset computation and correlation determination.

In the embodiment shown in FIG. 4, frame word search module 404 simply identifies the location of a repeating bit sequence within framing buffer 402A. The repeating bit sequence may be any pattern capable of indicating frame/word boundaries, as described more fully above. Because the frame sequence simply repeats in many embodiments, frame word search module 404 need not be programmable to accept varying patterns, although this feature could be readily incorporated into alternate embodiments. In the example shown in FIG. 4, a predetermined four-bit framing sequence is arbitrarily chosen to be "1101", which is present in frame buffer 402A on bits 3:6. This location corresponds to one bit behind the central "zero skew" location, indicating a frame offset 410 of one bit period at the time shown in FIG. 4.

Data word search modules 406B-Z similarly identify the presence of pre-determined bit patterns within corresponding data buffers 402B-Z as appropriate. In various embodiments, data word search modules 406B-Z are primarily operative when word synchronization module 105 is in correlation mode, which may occur during system initialization, at the initialization of a communications session or transmission, or at any other appropriate time. During correlation mode (which may be indicated by an enable signal 407 or the like), correlation word search modules 406B-Z are provided with one or more data correlation words 107, as briefly described above. These data correlation words can be received from a remote transmitter, from a system controller, or any other source, and are indicative of a repeated pattern being transmitted on one or more serial data channels 106B-Z. Data word search modules 406B-Z then identify the location of data stored in the associated buffer 402B-Z that matches the correlation word pattern. In the embodiment shown in FIG. 4, for example, the correlation word 107 is assumed to be "1000", which is found on bits 2:5 of buffer 402B and bits 1:4 of buffer 402Z. Using the central locations 2:5 as the "zero skew" reference for this example, the data in buffer 402B exhibits a value for data offset 420B, and the data in buffer 402Z exhibits a one-bit offset 420Z in the opposite direction as the frame offset 410 observed above. From this information, it can be readily determined that the data in buffer 402B is delayed by one bit period from the data in frame buffer 402A, and the data in buffer 402Z is delayed by two bit periods from the data in frame buffer 402A. This information may be provided to one or more parallel word extraction modules 408B-Z for use in subsequent retrieval of word-aligned parallel data. After correlation mode is complete, data word search modules 406B-Z may be disabled, or may act as sequencers that continue to provide offset values 420B-Z based upon prior values or the like. Additional detail about an exemplary process for determining offset information is described below with reference to FIG. 5.

Offset information obtained during the correlation period can be subsequently processed to extract parallel data from buffers 402B-Z as appropriate. Parallel word extraction modules 408B-Z each extract parallel data from the proper locations of one or more associated buffers 402B-Z. Parallel word extraction modules 408B-Z may be implemented with conventional digital circuitry and/or software logic as appropriate. In various embodiments, each word extraction module 408B-Z receives data bits in series or parallel from buffer 402B-Z and provides the data bits as a parallel data stream 108A-Z as appropriate. Word extraction modules 408B-Z suitably receive frame offset 410 from frame word search module 404 (or a sequencer or other module, as described more fully below) to indicate word boundaries in received serial data. As described more fully below, word boundaries may be indicated by a particular value (e.g. zero) of frame offset 410. In such embodiments, each parallel word extraction module 480B-Z obtains a data word from its associated buffer 402B-Z when the particular value of frame offset 410 occurs.

The proper location of the data word within buffer 402B-Z obtained can be deduced from the previously-determined offset values 420B-Z. To continue the example from above, a zero value of frame offset 410 indicates that a frame/word boundary has been encountered on framing channel 104A. Since the offset between channel 104A and channel 104B was previously determined to be one bit cycle, parallel word extraction module 408B determines that bits 1:5 of buffer 402B contain a complete data word. Similarly, parallel word extraction module 408Z determines that bits 0:4 of buffer 402Z contain a complete data word, based upon the two bit cycle offset previously identified. These extracted data bits can then be provided as parallel output signals 108A-Z.

Various enhancements and/or modifications could be made to the exemplary word synchronization module 105 shown in FIG. 4 and described above. The respective functions of buffers 402, word search modules 404, 406 and/or parallel word extraction modules 408 could be intercombined or supplemented in any manner, for example. The various offsets 410 and/or 420 may be additionally modified in modules 408B-Z or elsewhere to compensate for system delays (e.g. delays created by data loads and the like). Similarly, the logical layout shown in FIG. 4 may be modified significantly to implement any word/frame synchronization technique using any combinations of logic modules, signal processing and/or the like.

Figure 5:
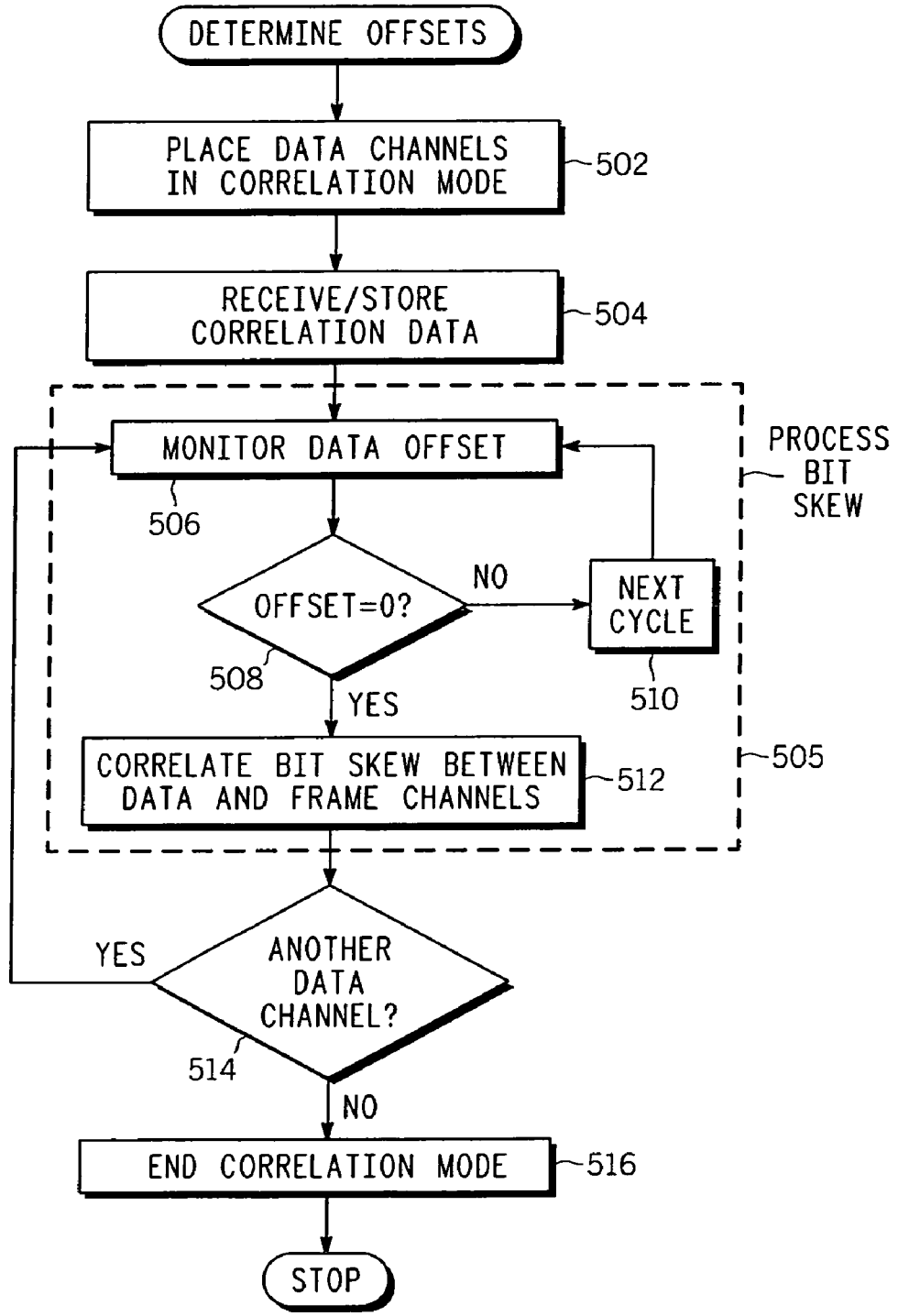
FIG. 5 is a flowchart of an exemplary process for determining frame-to-data channel offsets.

With reference now to FIG. 5, an exemplary process 500 for determining frame-to-data channel offsets suitably includes the broad steps of placing the data channels into a "correlation mode" (step 502), receiving and storing correlation data in each data buffer (step 504), processing bit skew offsets (step 505), and terminating correlation mode (step 516) to begin receiving and processing actual data. The various steps shown in process 500 are intended as logical representations of the various functions carried out by an exemplary word synchronization module 105, and not necessarily as a literal hardware or software implementation. The various functions shown in FIG. 5, for example, may be carried out in any type of integrated circuit logic, signal processing logic, or any other hardware and/or software data processing environment. Further, the various steps and modules shown in FIG. 5 may be differently combined and/or supplemented in a wide array of alternate embodiments.

Word synchronization module 105 is placed into correlation mode (step 502) in any manner. In various embodiments, correlation mode is entered by applying an appropriate enable signal 407 (FIG. 4) to one or more data word search modules 406B-Z. The enable signal may be provided from any controller or other digital interface as appropriate. Placing data word search modules 406B-Z in correlation mode indicates that correlation data 107 is present on one or more data channels 102A-Z. As mentioned above, the correlation data 107 may be provided to word synchronization module 105 and/or to data word search modules 406B-Z in any serial or parallel manner. Alternatively, the correlation data may be "hard coded" into word search modules 406B-Z, defined as part of a communications protocol, or otherwise defined in any manner. This data is appropriately bit synchronized, and the synchronized correlation data 107 is received and stored within one or more buffers 402A-Z (step 504).

Correlation mode also indicates that one or more word search modules 406B-Z may begin identifying the location and/or offset 420B-Z of the correlation data 107 stored within buffer 402B-Z to determine the amount of bit skew between the serial bitstreams (step 505). This determination may take place in any manner. In an exemplary embodiment, bit skew is identified between each data channel 102B-Z and framing channel 102A by monitoring the data buffer offset 420B-Z for each data channel (step 506) while the received data sequences through buffer 402 (step 510) until offset value 420 reaches a particular known value (step 508). The known value may be a zero value, for example, indicating that the correlation bit sequence is located at the reference location (e.g. the central bits 2:5 in the example above) within buffer 402B-Z, although other embodiments will use other parameters.

When correlation sequence 107 is located in a known position within buffer 402 (e.g. at the zero offset position), the data offset 410 for the buffer 402 can be readily correlated to the framing offset 410 (step 512) to determine an offset value used in subsequent data processing. Because the data offset 420 is in a known state (e.g. zero offset), the bit skew between the data channel of interest and the framing channel can be readily ascertained from frame offset 410. This offset may be processed and/or stored within word extraction module 408 and/or any other circuitry within word synchronization module 105.

The bit skew identification process suitably repeats (step 514) for each data channel 106. In various embodiments, data-to-frame correlation takes place concurrently for each data channel 106B-Z. After correlation values have been determined for all of the data channels, correlation mode is exited (step 516) by de-activating enable signal 407 and/or by any other appropriate actions. Correlation mode may be exited for any suitable time period. In various embodiments, the data sender transmits correlation data sequences before and after correlation mode is entered to ensure that no intended data words are dropped during the correlation process.

Figure 6:
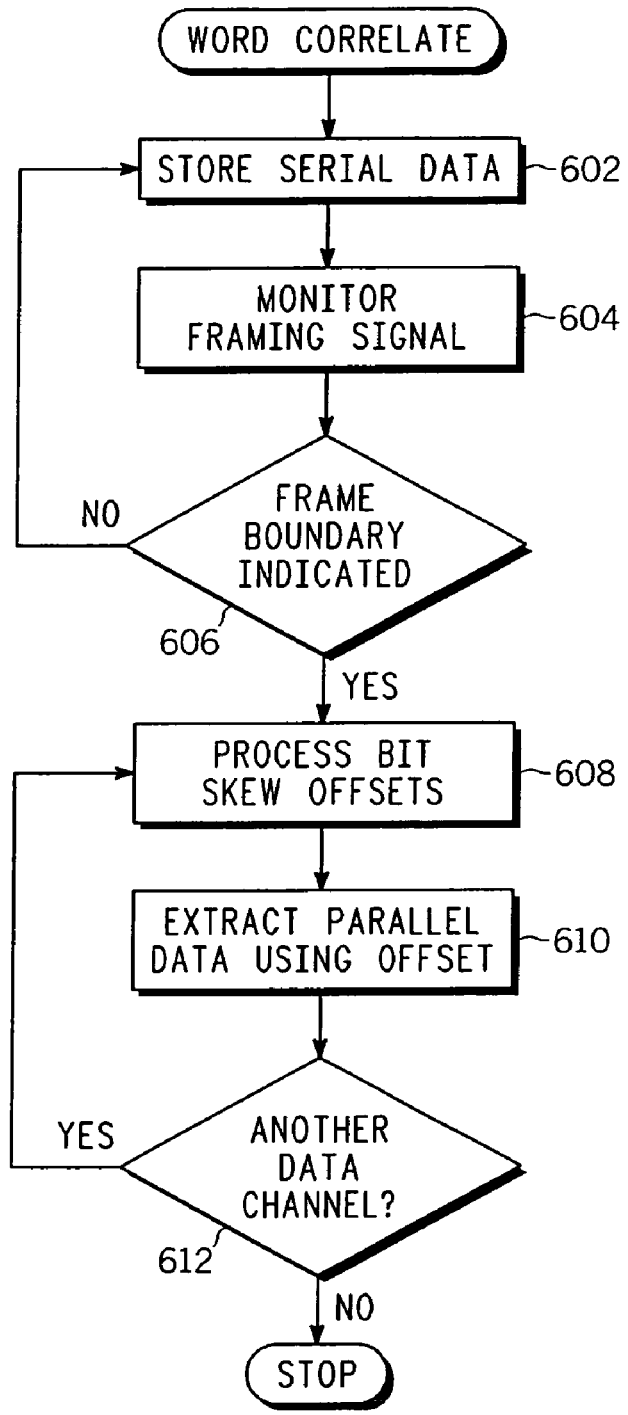
FIG. 6 is a flowchart of an exemplary process for correlating data words to a framing signal.

Referring now to FIG. 6, an exemplary word synchronization process 600 suitably includes the broad steps of storing serial data in a buffer (step 602), monitoring the framing signal (step 604) to identify word or frame boundaries (step 606), and extracting parallel data when a frame boundary occurs (step 610) using the previously-determined data-to-frame channel offset values. Word/frame boundaries can be indicated in any manner, such as through the occurrence of a zero offset (or other known offset value) in framing offset signal 410. In such cases, the predetermined offset value for the data channel that was previously stored during the correlation mode (e.g. process 500) can be readily applied to extract the appropriate bits from buffer 402 to produce the correct parallel output word 108. In various embodiments, additional processing of the bit skew offsets may be provided (step 608) through application of system offsets or the like. Such additional processing may take place within word extraction modules 408, word search modules 406 and/or other circuitry within word synchronization module 105. Parallel data can be extracted from any number of data channels (step 612) as appropriate, such as using the techniques described above.

Figure 7:
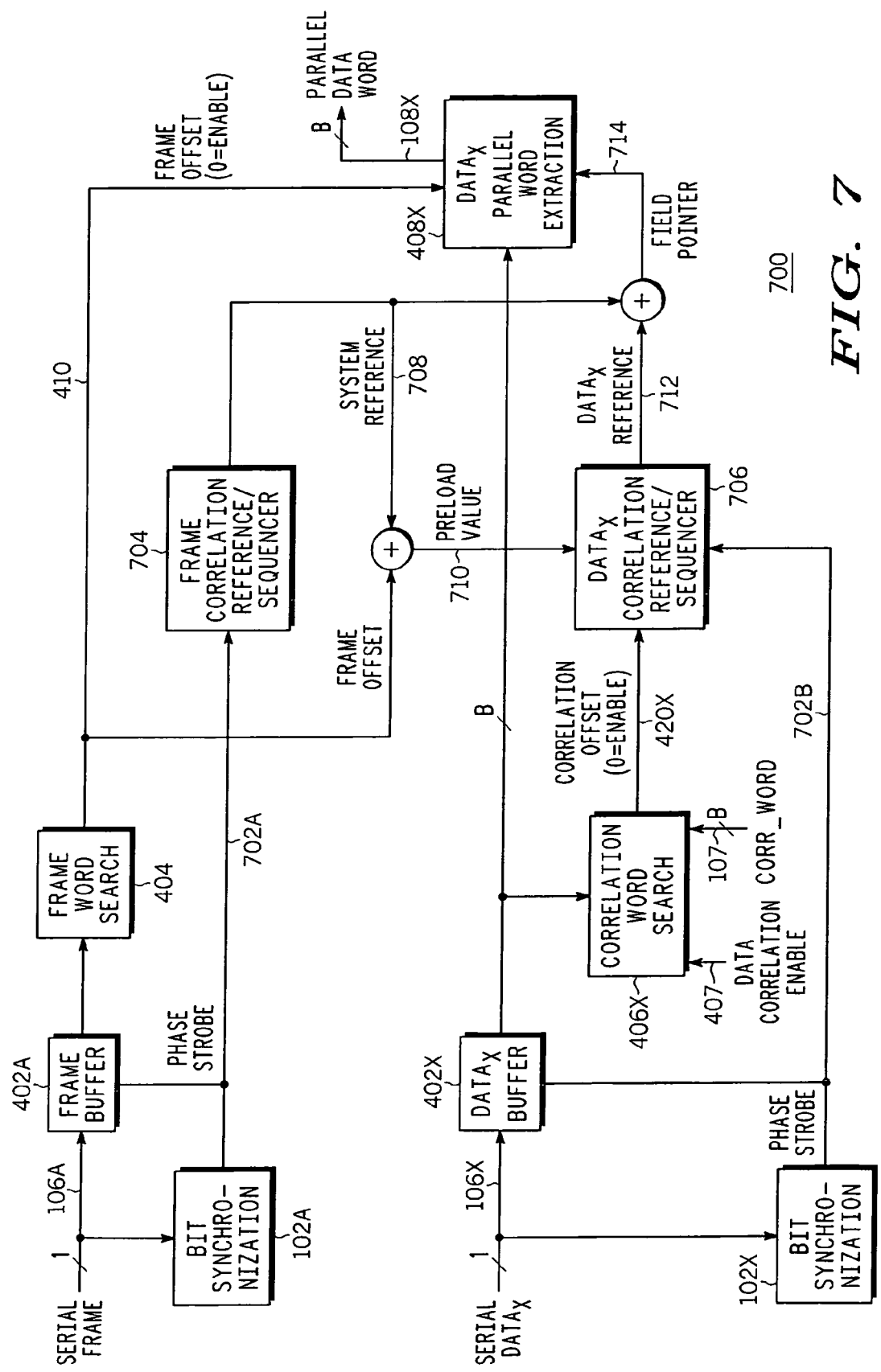
FIG. 7 is a block diagram of an alternate embodiment of a data synchronization system.

The various processes and systems described above may be readily modified to create a vast array of alternate but equivalent embodiments. FIG. 7, for example, shows an alternate system 700 for synchronizing multi-pin serial data that provides additional integration of the bit and word synchronization features. In the embodiment shown in FIG. 7, the framing channel 106A and each of the data channels 106x are bit synchronized with a digital phase lock loop (DPLL) or similar structure capable of producing a phase strobe 702 that indicates a desired sampling cycle from amongst the overclocked cycles of the serial input stream. The various serial channels are not necessarily phase synchronized to each other in this embodiment, so phase strobe 702 is used to extract data from buffer 402 at the desired overclocked cycle. Phase strobe 702 is also provided to a sequencer 704, 706 associated with each serial channel. Sequencers 704 and 706 are simply counters that sequence through a number of finite states (typically equal to the number of bits in a word) to indicate a bit state of data stored within buffer 402. Each sequencer is updated based upon the phase strobe 702 received from the bit synchronization module 102 to maintain consistent phasing within each channel 102. The output 708 of frame sequencer 704 can be combined with frame offset signal 410 in certain embodiments to create a suitable preload value that can be loaded into data sequencer 706 during correlation mode. Alternatively or additionally, output 708 from frame sequencer 708 can be used to update a field pointer 714 used to indicate the desired location of a data word in buffer 402x. Because field pointer 714 is produced from sequencers 704 and 706, the pointer is appropriately updated in response to phase strobes 702A and 702x, thereby bypassing the need to perform phase synchronization of each serial bitstream as described above. Again, the various embodiments of the systems and techniques described herein will vary significantly from embodiment to embodiment.

Various exemplary embodiments include the following:

According to various embodiments, a method is provided for word synchronizing data received on a plurality of serial data channels to a framing signal received on a framing channel. A plurality of offset values are initially determined, with each offset value indicating the amount of skew observed between the framing channel and one of the plurality of serial data channels, and the data received on each of the plurality of serial data channels is stored in at least one buffer. The framing signal is monitored to identify a frame boundary, and parallel data is extracted from the at least one buffer in response to the frame boundary. The location of the parallel data within the at least one buffer can be appropriately identified by the plurality of offset values. In various further embodiments, the step of initially determining the plurality of offset values additionally involves the steps of receiving correlation data on each of the plurality of serial data channels, determining a data offset for each of the serial data channels, correlating the data offset for each of the serial data channels to a frame offset from the framing channel to thereby determine the offset value for each serial data channel. The frame offset may additionally be optionally selected as the offset value when the data offset is a known value, such as zero. The correlation data and/or the framing data may include a repeated string of bits having pre-determined values; the pre-determined string of bits may be received before the correlation data. Further, the correlation data and/or framing data may be configured to repeat only at a frame or word boundary. A correlation mode may be entered prior to the determining step and/or exited at any point after the determining step.

In other embodiments, a device is provided for word synchronizing a plurality of serial bitstreams in a multi-pin asynchronous interface, with the plurality of serial bitstreams comprising a framing bitstream and a plurality of data bitstreams. The device comprises a plurality of buffers, each buffer corresponding to one of the serial bitstreams, as well as a plurality of word search modules and word extraction modules. The plurality of word search modules each correspond to one of the plurality of buffers, wherein each of the plurality of word search modules is configured to generate an offset signal identifying a location of a predetermined bit pattern in the corresponding buffer. The plurality of parallel word extraction modules are each coupled to an associated one of the buffers and to an associated one of the word search modules corresponding to one of the data bitstreams. Each parallel word extraction module is configured to extract a parallel data word from the associated buffer using the data offset signal produced by the associated word search module in response to the offset signal produced by the word search module corresponding to the framing bitstream. In various further embodiments, the word search modules corresponding to each of the data bitstreams are further configured to receive an enable signal and to enter a correlation mode in response thereto. The word search modules corresponding to each of the data bitstreams may be further configured receive a correlation word as the predetermined bit pattern, and each of the plurality of buffers may be maintained as shift registers.

In various further embodiments, a plurality of bit synchronization modules may be further associated with one of the serial bitstreams and configured to provide a phase strobe signal to the frame buffer. A frame correlation reference sequencer configured to receive the phase strobe from the bit synchronization module associated with the framing bitstream and to sequentially indicate the state of the framing bitstream. A plurality of data correlation reference sequencers each associated with one of the data bitstreams and coupled between the word search module and the parallel word extraction module corresponding to the associated data bitstream may also be provided, with each data correlation reference sequencer configured to receive the phase strobe signal from one of the bit synchronization modules and to sequentially indicate the state of the associated data bitstream.

In other embodiments, a system for synchronizing a plurality of serial bitstreams having a common bitrate that are each received at a multi-pin asynchronous interface is provided. The serial bitstreams comprise a framing bitstream and a plurality of data bitstreams. A clock generator is configured to produce a common clock signal having a frequency substantially equal to an integer multiple of the common bitrate. A plurality of bit synchronization modules are each associated with one of the plurality of serial bitstreams and configured to receive the common clock signal, and to bit synchronize the associated bitstream to the other serial bitstreams using the common clock signal. A word synchronization module is configured to receive each of the bit synchronized bitstreams from the plurality of bit synchronization modules and to extract parallel data words therefrom. The word synchronization module comprises a plurality of buffers, each buffer corresponding to one of the synchronized bitstreams, a plurality of word search modules each corresponding to one of the plurality of buffers, wherein each of the plurality of word search modules is configured to generate an offset signal identifying a location of a predetermined bit pattern in the corresponding buffer, and a plurality of parallel word extraction modules, each of the plurality of parallel word extraction modules coupled to an associated one of the buffers and to an associated one of the word search modules each corresponding to one of the data bitstreams, and wherein each parallel word extraction module is configured to extract a parallel data word from the associated buffer using the data offset signal produced by the associated word search module in response to the offset signal produced by the word search module corresponding to the framing bitstream. Further, various embodiments of the bit synchronization module comprise an activity detection module configured to detect bit transitions occurring during each of a plurality of phases of the associated bitstream, each phase corresponding to a cycle of the common clock signal, a phase selection module coupled to the activity detection module and configured to select one of the plurality of phases based upon the bit transitions detected within each of the plurality of phases, and a phase extraction module coupled to the phase selection module, wherein the phase extraction module is configured to extract the selected phase of the associated bitstream to thereby bit synchronize the associated bitstream to the other serial bitstreams. The system may be, for example, an interface between a radio frequency transceiver and a baseband modem, and/or any other interface used in data, voice, multimedia or other communications.

While these and other exemplary embodiments have been presented in the foregoing detailed description, it should be appreciated that a vast number of alternate embodiments and equivalent variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method comprising:
    receiving data on a plurality of serial data channels and a framing signal on a framing channel that is physically distinct from the plurality of serial data channels, wherein the framing signal and the data are each generated by a transmitter, and wherein the framing signal is an asynchronous signal that indicates a frame boundary;
    initially determining a plurality of offset values in a correlation mode, each offset value indicating the amount of skew observed between the framing channel and one of the plurality of serial data channels;
    after exiting the correlation mode, storing the data received on each of the plurality of serial data channels in at least one buffer;
    monitoring the framing signal received from the transmitter on the framing channel to identify the frame boundary; and
    extracting parallel data from the at least one buffer, wherein the location of the parallel data within the at least one buffer is identified by the frame boundary in combination with at least one of the plurality of offset values initially determined in the correlation mode.

2. The method of claim 1 wherein the step of initially determining the plurality of offset values comprises the steps of:
    receiving correlation data on each of the plurality of serial data channels;
    determining a data offset for each of the serial data channels; and
    correlating the data offset for each of the serial data channels to a frame offset from the framing channel to thereby determine the offset value for each serial data channel.

3. The method of claim 2 wherein the step of initially determining the plurality of offset values further comprises the step of selecting the frame offset as the offset value when the data offset is a known value.

4. The method of claim 3 wherein the known value corresponds to a bit offset of zero.

5. The method of claim 2 wherein the correlation data comprises a repeated string of bits having pre-determined values.

6. The method of claim 5 further comprising the step of receiving the pre-determined string of bits before receiving the correlation data.

7. The method of claim 1 wherein the data transmitted on each of the plurality of data channels is asynchronous data.

8. The method of claim 1 wherein the framing signal comprises a repeated string of bits having pre-determined values.

9. The method of claim 8 wherein the repeated string of bits is configured to repeat only at the frame boundary.

10. A device comprising:
a multi-pin asynchronous interface configured to receive a plurality of asynchronous serial bitstreams generated by a data transmitter and transmitted on a plurality of physically separate channels, the plurality of serial bitstreams comprising a framing bitstream and a plurality of data bitstreams, wherein the framing bitstream is an asynchronous bitstream that is provided on a framing channel that is physically distinct from channels that provide the data bitstreams, and wherein the framing bitstream comprises framing data indicating a frame boundary;
a plurality of buffers, each buffer corresponding to one of the serial bitstreams;
a plurality of word search modules each corresponding to one of the plurality of buffers, wherein each of the plurality of word search modules is configured to generate an offset signal identifying a location of a predetermined bit pattern in the corresponding buffer in an initial correlation mode; and
a plurality of parallel word extraction modules, each of the plurality of parallel word extraction modules coupled to an associated one of the buffers and to an associated one of the word search modules each corresponding to one of the data bitstreams, and wherein each parallel word extraction module is configured to extract a parallel data word from the associated buffer in an operating mode after the correlation mode is complete using the data offset signal produced by the associated word search module and the framing data provided by data transmitter via the framing bitstream.

11. The device of claim 10 wherein the word search modules corresponding to each of the data bitstreams are further configured to receive an enable signal and to enter the correlation mode in response thereto.

12. The device of claim 10 wherein the word search modules corresponding to each of the data bitstreams are further configured receive a correlation word as the predetermined bit pattern.

13. The device of claim 10 wherein each of the plurality of buffers are maintained as shift registers.

14. The device of claim 13 further comprising a plurality of bit synchronization modules each associated with one of the serial bitstreams and configured to provide a phase strobe signal to the one of the plurality of buffers that corresponds to the framing bitstream.

15. The device of claim 14 further comprising a frame correlation reference sequencer configured to receive the phase strobe from the bit synchronization module associated with the framing bitstream and to sequentially indicate the state of the framing bitstream.

16. The device of claim 14 further comprising a plurality of data correlation reference sequencers each associated with one of the data bitstreams and coupled between the word search module and the parallel word extraction module corresponding to the associated data bitstream, each data correlation reference sequencer configured to receive the phase strobe signal from one of the bit synchronization modules and to sequentially indicate the state of the associated data bitstream.

17. A system for synchronizing a plurality of serial bitstreams, the system comprising:
a multi-pin asynchronous interface configured to receive the plurality of serial bitstreams from a transmitter, the plurality of serial bitstreams comprising a framing bitstream and a plurality of data bitstreams each having a common bitrate, wherein the framing bitstream is an asynchronous signal that is provided on a physically separate pin from the data bitstreams and that indicates a frame boundary;
a clock generator configured to produce a common clock signal having a frequency substantially equal to an integer multiple of the common bitrate;
a plurality of bit synchronization modules each associated with one of the plurality of serial bitstreams and configured to receive the common clock signal, and to bit synchronize the associated bitstream to the other serial bitstreams using the common clock signal; and
a word synchronization module configured to receive each of the bit synchronized bitstreams from the plurality of bit synchronization modules and to extract parallel data words therefrom, the word synchronization module comprising:
a plurality of buffers, each buffer corresponding to one of the synchronized bitstreams;
a plurality of word search modules each corresponding to one of the plurality of buffers, wherein each of the plurality of word search modules is configured to generate an offset signal identifying a location of a predetermined bit pattern in the corresponding buffer in an initial correlation mode; and
a plurality of parallel word extraction modules, each of the plurality of parallel word extraction modules coupled to an associated one of the buffers and to an associated one of the word search modules each corresponding to one of the data bitstreams, and wherein each parallel word extraction module is configured to extract a parallel data word from the associated buffer in an operating mode after the correlation mode is complete using the data offset signal produced by the associated word search module and the frame boundary indicated by the framing bitstream.

18. The system of claim 17 wherein each of the bit synchronization modules comprise:
an activity detection module configured to detect bit transitions occurring during each of a plurality of phases of the associated bitstream, each phase corresponding to a cycle of the common clock signal;
a phase selection module coupled to the activity detection module and configured to select one of the plurality of phases based upon the bit transitions detected within each of the plurality of phases; and
a phase extraction module coupled to the phase selection module, wherein the phase extraction module is configured to extract the selected phase of the associated bitstream to thereby bit synchronize the associated bitstream to the other serial bitstreams.

19. The system of claim 17 wherein the system is an interface between a radio frequency transceiver and a baseband modem.

* * * * *